United States Patent
Drolet et al.

(10) Patent No.: US 11,713,733 B2
(45) Date of Patent: Aug. 1, 2023

(54) METHODS AND SYSTEMS FOR OPERATING AN ENGINE TO GENERATE ADDITIONAL THRUST

(71) Applicant: PRATT & WHITNEY CANADA CORP., Longueuil (CA)

(72) Inventors: Martin Drolet, Saint-Amable (CA); Francis Demers, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/402,352

(22) Filed: Aug. 13, 2021

(65) Prior Publication Data
US 2023/0050939 A1   Feb. 16, 2023

(51) Int. Cl.
*F02K 3/115* (2006.01)

(52) U.S. Cl.
CPC .......... *F02K 3/115* (2013.01); *F05D 2220/32* (2013.01); *F05D 2270/051* (2013.01); *F05D 2270/303* (2013.01)

(58) Field of Classification Search
CPC ...................................................... F02K 3/115
See application file for complete search history.

(56) References Cited

U.S. PATENT DOCUMENTS

| | | | |
|---|---|---|---|
| 6,837,225 B1 * | 1/2005 | Fukuda | F02D 41/406 123/552 |
| 2007/0101696 A1 | 5/2007 | Dooley | |
| 2008/0141655 A1 * | 6/2008 | Johnson | F02K 3/077 60/226.3 |
| 2012/0216545 A1 * | 8/2012 | Sennoun | F02K 3/115 60/785 |
| 2018/0058243 A1 | 3/2018 | Auker et al. | |
| 2018/0127103 A1 | 5/2018 | Cantemir | |
| 2019/0249599 A1 | 8/2019 | Sen et al. | |
| 2019/0257247 A1 | 8/2019 | Pal et al. | |
| 2020/0165972 A1 * | 5/2020 | Zebian | F02K 3/115 |

OTHER PUBLICATIONS

European Patent Office, Communication re. extended European search report for European patent application No. 22189972.7, dated Jan. 3, 2023.

* cited by examiner

*Primary Examiner* — Katheryn A Malatek
(74) *Attorney, Agent, or Firm* — Norton Rose Fulbright Canada LLP

(57) ABSTRACT

In a method for operating an engine, a request for an increase in thrust generated by the engine is received. In response to receipt of the request, a determination is made as to whether at least one operating condition for heat application-based thrust is met. If so, a heat source is applied to heat bypass air flowing through the bypass duct towards the exhaust nozzle and the increase in thrust is generated from an increased temperature of mixed bypass air and core air at the exhaust nozzle.

19 Claims, 8 Drawing Sheets

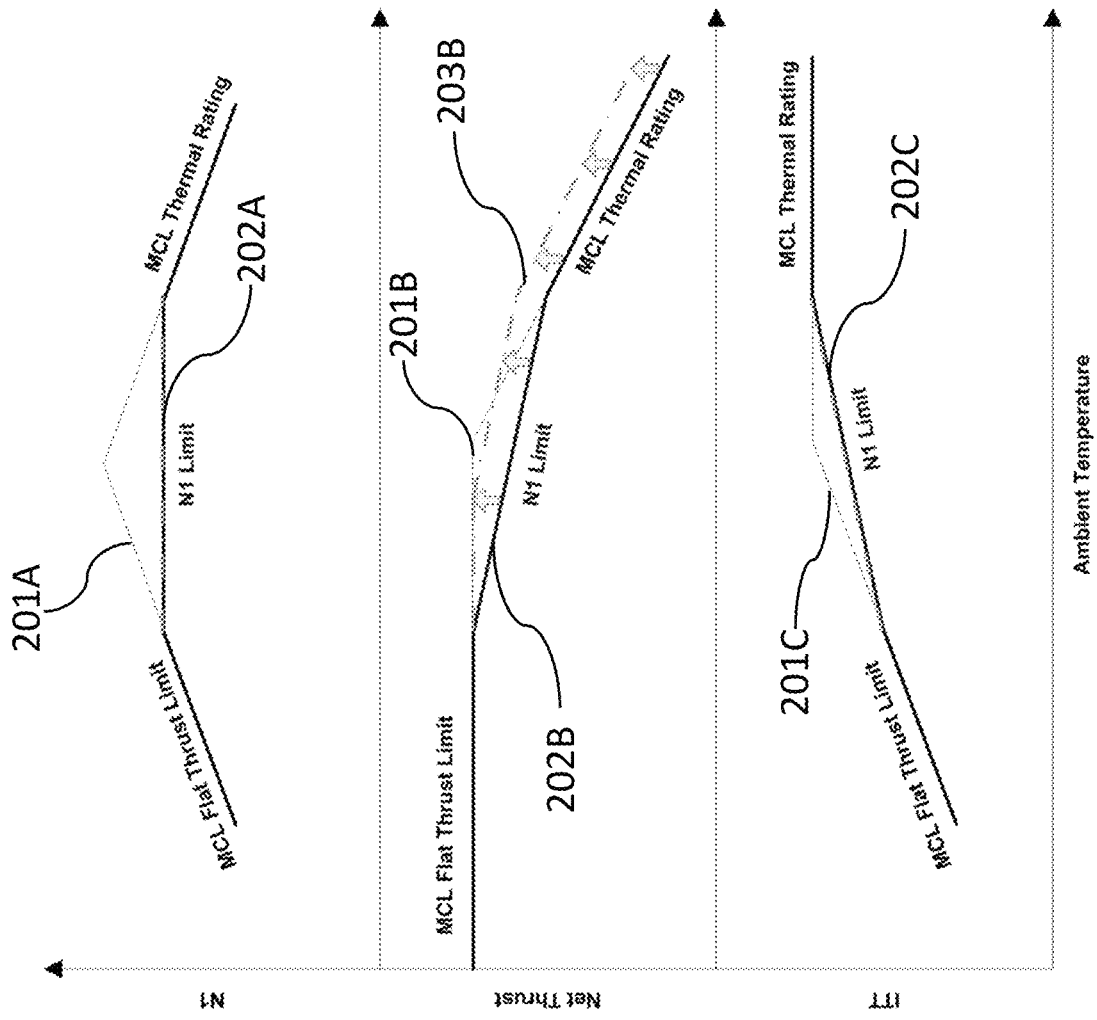

METHODS AND SYSTEMS FOR OPERATING AN ENGINE TO GENERATE ADDITIONAL THRUST

TECHNICAL FIELD

The present disclosure relates generally to aircraft engines and, more particularly, to systems and methods for generating additional thrust in aircraft engines.

BACKGROUND OF THE ART

Aircraft engines, for instance turbofan-type gas turbine engines, may be provided with high bypass ratios for increased propulsive efficiency and reduced fuel consumption. However, when an aircraft is provided with an engine with a high bypass ratio, there may be a measurable difference between the thrust provided at take-off and the thrust provided while climbing and at higher altitudes. For instance, the flow of gases through the exhaust nozzle may be choked (i.e. flowing at the speed of sound), preventing further thrust from being provided. If the aerodynamic or mechanical limit of the fan has been reached, for instance while the aircraft is climbing or has reached a high altitude, it cannot rotate any faster to provide a desired increase in thrust.

SUMMARY

In one aspect, there is provided a method for operating an engine, the engine having an engine core, a bypass duct, and an exhaust nozzle. A request for an increase in thrust generated by the engine is received. In response to receipt of the request, a determination is made as to whether at least one operating condition for heat application-based thrust is met. If so, a heat source is applied to heat bypass air flowing through the bypass duct towards the exhaust nozzle and the increase in thrust is generated from an increased temperature of mixed bypass and core air at the exhaust nozzle.

In another aspect, there is provided a system for operating an engine, the engine having an engine core, a bypass duct, and an exhaust nozzle. The system comprises a processor and a non-transitory computer-readable medium having stored thereon program instructions. The program instructions are executable by the processor for receiving a request for an increase in thrust generated by the engine; in response to receipt of the request, determining that at least one operating condition for heat application-based thrust is met; in response to the determining, applying a heat source to heat bypass air flowing through the bypass duct towards the exhaust nozzle; and generating the increase in thrust from an increased temperature of mixed bypass and core air at the exhaust nozzle.

In a further aspect, there is provided an engine system comprising an engine having an engine core, a bypass duct, and an engine nozzle. A heat source is positioned relatively to at least one conductive surface of the engine. A controller is operatively coupled to the heat source and configured for applying heat from the heat source to the at least one conductive surface of the engine when at least one operating condition is met, and to generate an increase in thrust from an increased temperature of mixed bypass and core air at the exhaust nozzle through convection heating of the bypass air from the at least one conductive surface.

DESCRIPTION OF THE DRAWINGS

Reference is now made to the accompanying figures in which:

FIGS. 2A-2C are graphical representations of various engine parameters;

DETAILED DESCRIPTION

Figure 1:
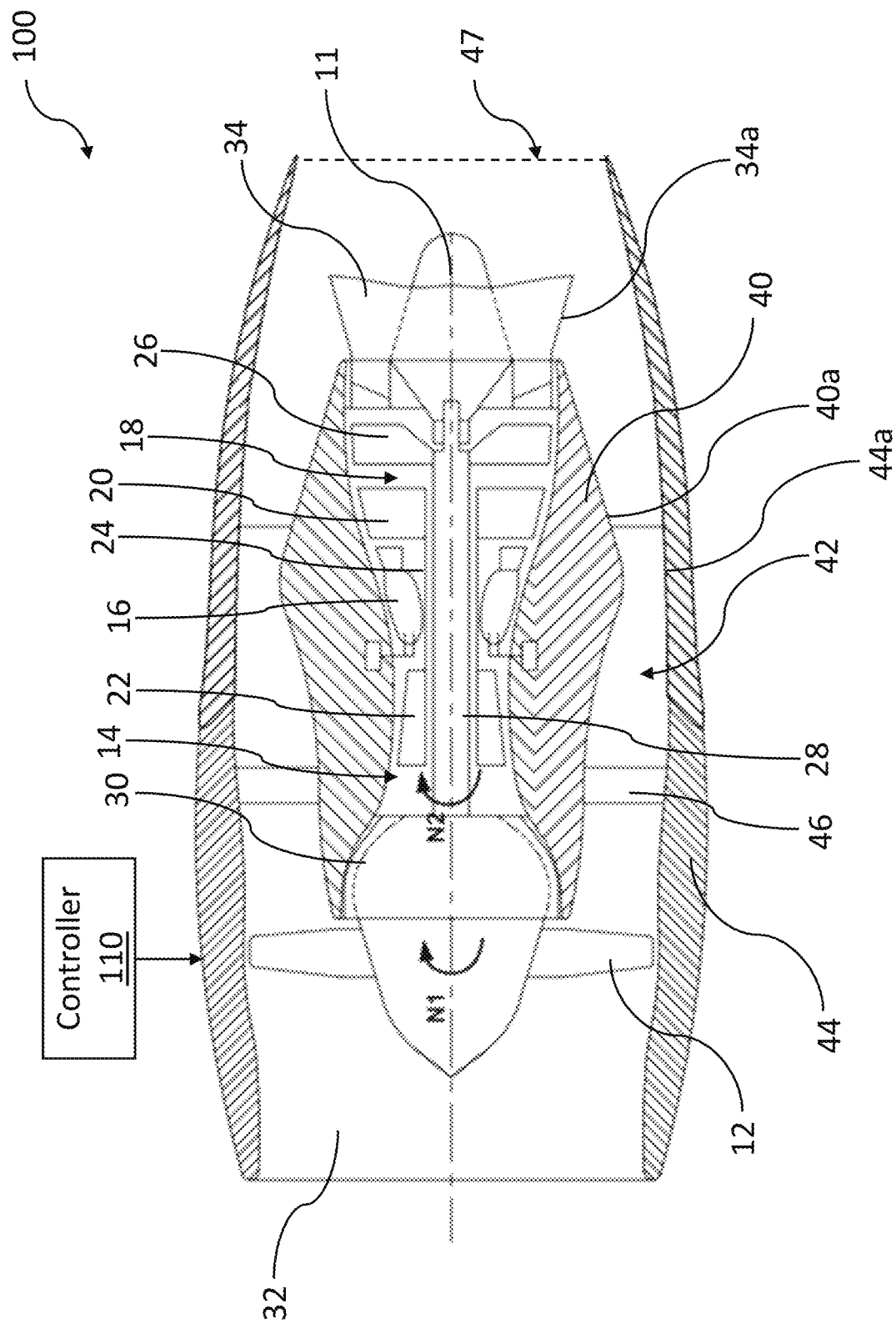
FIG. 1 is a schematic cross sectional view of an aircraft engine.

The present disclosure is directed to methods and systems for operating an engine. FIG. 1 illustrates an example engine 100 of a type provided for use by an aircraft in subsonic flight. The engine 100 of FIG. 1 is a turbofan engine that generally comprises, in serial flow communication, a fan 12 through which ambient air is propelled toward an inlet 32, a compressor section 14 for pressurizing the air, a combustor 16 in which the compressed air is mixed with fuel and ignited for generating an annular stream of hot combustion gases, and a turbine section 18 for extracting energy from the combustion gases, which are mixed by a mixer 34 and exit via an exhaust nozzle 47. High-pressure rotor(s) of the turbine section 18 (referred to as "HP turbine 20") are mechanically linked to high-pressure rotor(s) of the compressor section 14 (referred to as "HP compressor 22") through a high-pressure shaft 24.

According to the illustrated example, the engine 100 is provided in the form of a multi-spool engine having a high pressure (HP) spool and a low pressure (LP) spool independently rotatable about axis 11. However, it is understood that a multi-spool engine could have more than two spools. It should also be noted that the embodiments described herein also consider the use of single-spool engines.

Low-pressure rotor(s) of the turbine section 18 (referred to as "LP turbine 26") are mechanically linked to the low-pressure rotor(s) of the compressor section 14 (referred to as "LP compressor 30") and/or the fan 12 through a concentric low-pressure shaft 28 (referred to as an "LP shaft 28") extending within the high-pressure shaft 24 and rotating independently therefrom. The high pressure components (HP turbine 20, HP compressor 22, HP shaft 24) form the high pressure spool (referred to as "HP spool"), while the low pressure components (LP turbine 26, LP shaft 28, LP compressor 30) form the low pressure spool (referred to as "LP spool"). In the shown embodiment, the fan 12 extends forwardly from the LP shaft 28 and is mechanically coupled thereto to be driven by the LP turbine 26. The rotational speed of the fan 12, generally referred to as N1, is thus limited by the rotational speed of the LP spool, while the HP spool rotates at a second rotational speed generally referred to as N2.

The compressor section 14, combustor 16 and turbine section 18 are contained within an engine core 40 surrounded by a bypass duct 42 carrying bypass air generated by the fan 12. An engine casing 44 surrounds the engine core 40, with the bypass duct 42 radially defined between the engine casing 44 and engine core 40. Illustratively, a plurality of engine bypass struts 46 support the engine core 40 within the engine casing 44.

Control of the operation of the engine 100 can be effected by one or more control systems, for example a controller 110, which is communicatively coupled to the engine 100. The operation of the engine 100 can be controlled by way of one or more actuators, mechanical linkages, hydraulic systems, and the like. The controller 110 can be coupled to the actuators, mechanical linkages, hydraulic systems, and the like, in any suitable fashion for effecting control of the engine 100. The controller 110 can modulate the position and orientation of variable geometry mechanisms within the engine 100, the bleed level of the engine 100, and fuel flow, based on predetermined schedules or algorithms. In some embodiments, the controller 110 includes one or more FADEC(s), electronic engine controller(s) (EEC(s)), or the like, that are programmed to control the operation of the engine 100.

Engine 100 may operate with a high bypass ratio, i.e. a ratio of the mass flow rate through the bypass duct 42 to the mass flow rate entering the engine core 40, for instance to increase propulsive efficiency and thus reduce fuel consumption. One of the drawbacks of increasing the engine bypass ratio is it suffers from a greater difference between the maximum thrust available at take-off and the maximum thrust available at maximum climb due to the reduced jet velocity. This may result in a choked flow at the exhaust nozzle 47, whereby the flow is travelling at the speed of sound (Mach 1). At such speeds, the fan 12 may have reached its aerodynamic or mechanical limit (rotating at a maximum rotational speed of the LP spool), for instance while the aircraft is climbing or flying at high altitudes, and may not be able to rotate any faster to increase thrust. It will be understood that the actual location of choked flow may vary in the exhaust nozzle 47 and is represented conceptually as occurring at a plane defining the exhaust nozzle 47.

As such, the present disclosure describes systems and methods for providing additional thrust to the engine 100 in certain circumstances, by using one or more heat source to increase a temperature of bypass air flowing through the exhaust nozzle 47. The bypass air may be heated at various stages of the engine 100, such as in the bypass duct 42 and/or at or near the exhaust nozzle 47. As used herein, a heat source comprises one or more components capable of transferring heat to the bypass air, directly or indirectly. In some embodiments, the heat source comprises a power source of the engine 100 such as, but not limited, to a battery, a hydrogen fuel cell, an auxiliary power unit, and combinations thereof. Existing power sources for the engine 100, for instance in engines employing a hybrid powertrain, existing power sources for an aircraft, as well as dedicated power sources for the purposes of acting as a heat source, may be used. In some embodiments, the heat source is an electrical device that converts alternating current (AC) into heat. In some embodiments, the heat source is an electrical device that converts direct current (DC) into heat. In some embodiments, the heat source is operable to directly heat the bypass air. In some embodiments, the heat source is operable to apply heat to one or more conductive surfaces of the engine 100 by electromagnetic induction, and the bypass air is heated by convection heating as the bypass air comes in contact with the one or more conductive surface. Other means for heating the bypass air may be contemplated as well.

Referring to FIGS. 2A-2C, there are shown three graphs depicting the effects of applying a heat source to heat bypass air flowing through the bypass duct 42 towards the exhaust nozzle 47, at a constant rotational speed (N1) of the fan 12, to increase exhaust gas temperature and thus provide additional thrust. Exhaust gas temperature as defined herein refers to the temperature of the gas leaving the engine at the exhaust nozzle 47. FIG. 2A illustrates N1 relative to ambient temperature. FIG. 2B illustrates net thrust relative to ambient temperature. FIG. 2C illustrates inter-turbine temperature (ITT—also called inter-stage turbine temperature) relative to ambient temperature. As used herein, ITT refers to the temperature of the gases in the engine core 40 between the high pressure turbine 20 and the low pressure turbine 26, as illustrated in FIG. 1. It will be understood that the use of ITT in this example is merely to indicate a temperature for which a thermal limit of the engine is reached. In some embodiments, ITT may be replaced with a surrogate or adjacent temperature, such as T4 (found at the exit of the combustor 16) or T41 (the first stator outlet temperature). In each of FIGS. 2A-2C, the values for N1, net thrust and ITT, respectively, in an ideal scenario are represented by respective dotted lines 201A, 201B, 201C. As shown in FIGS. 2A-2C, these values are each limited by the mechanical N1 limit, represented by lines 202A, 202B, 202C, respectively. However, by applying a heat source to heat the bypass air flowing through the bypass duct 42 towards the exhaust nozzle 47, thereby increasing the temperature of the mixed air at the exhaust nozzle 47, net thrust can be increased to line 203B. In addition, as shown in FIG. 2B, this increase in net thrust may be extended over a wider range of ambient temperatures, thus increasing the range of the thrust limit over a wider range of ambient temperatures for certain circumstances, such as when the aircraft is in max climb. As shown in FIGS. 2A and 2C, N1 and ITT do not change after the heat source is applied to the bypass air. Thus, additional thrust is generated for a same N1 and ITT.

Figure 3A:
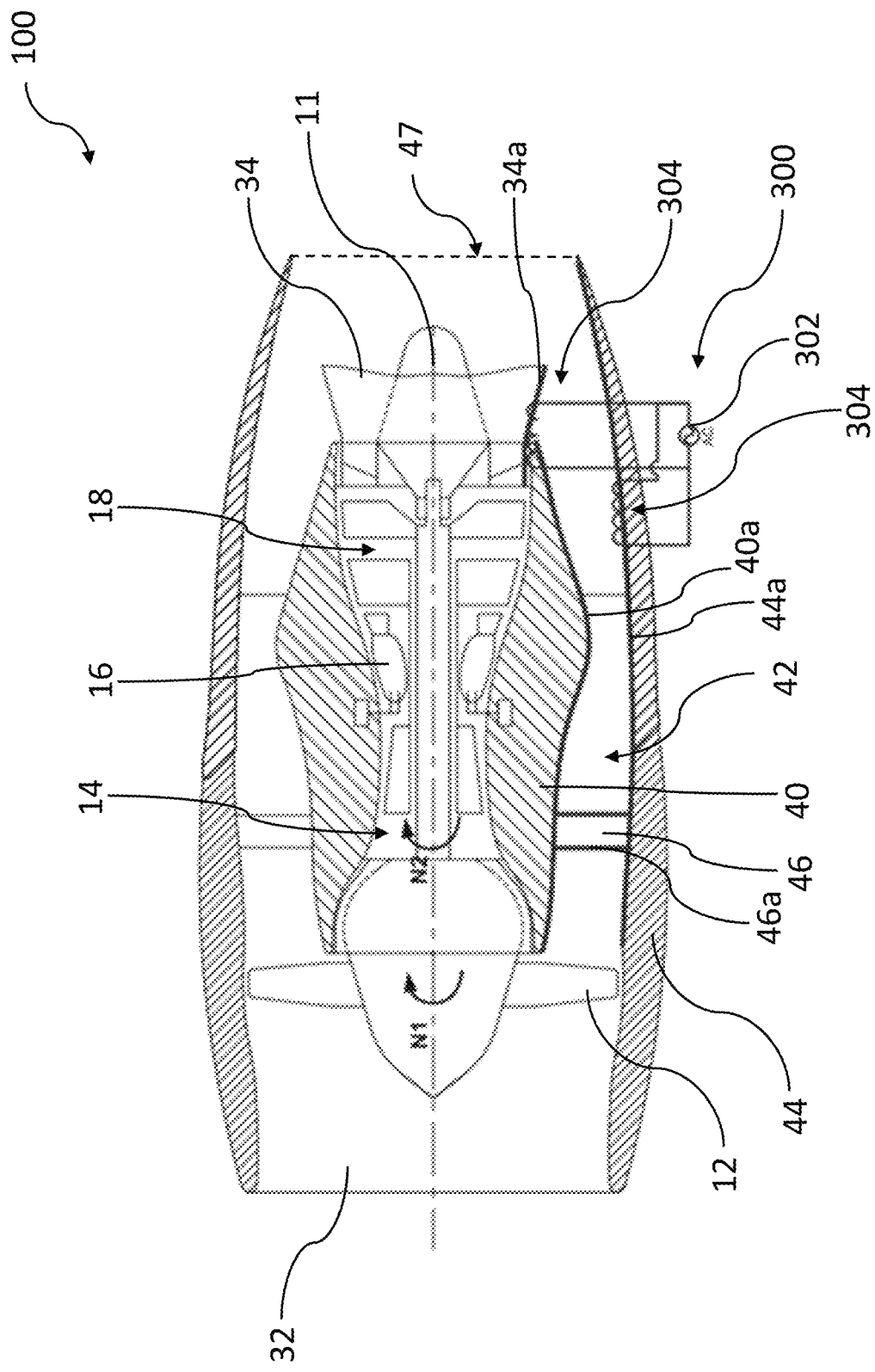
FIGS. 3A-3C are schematic cross sectional views of aircraft engines with example heat sources for the bypass duct.
Figure 3B:
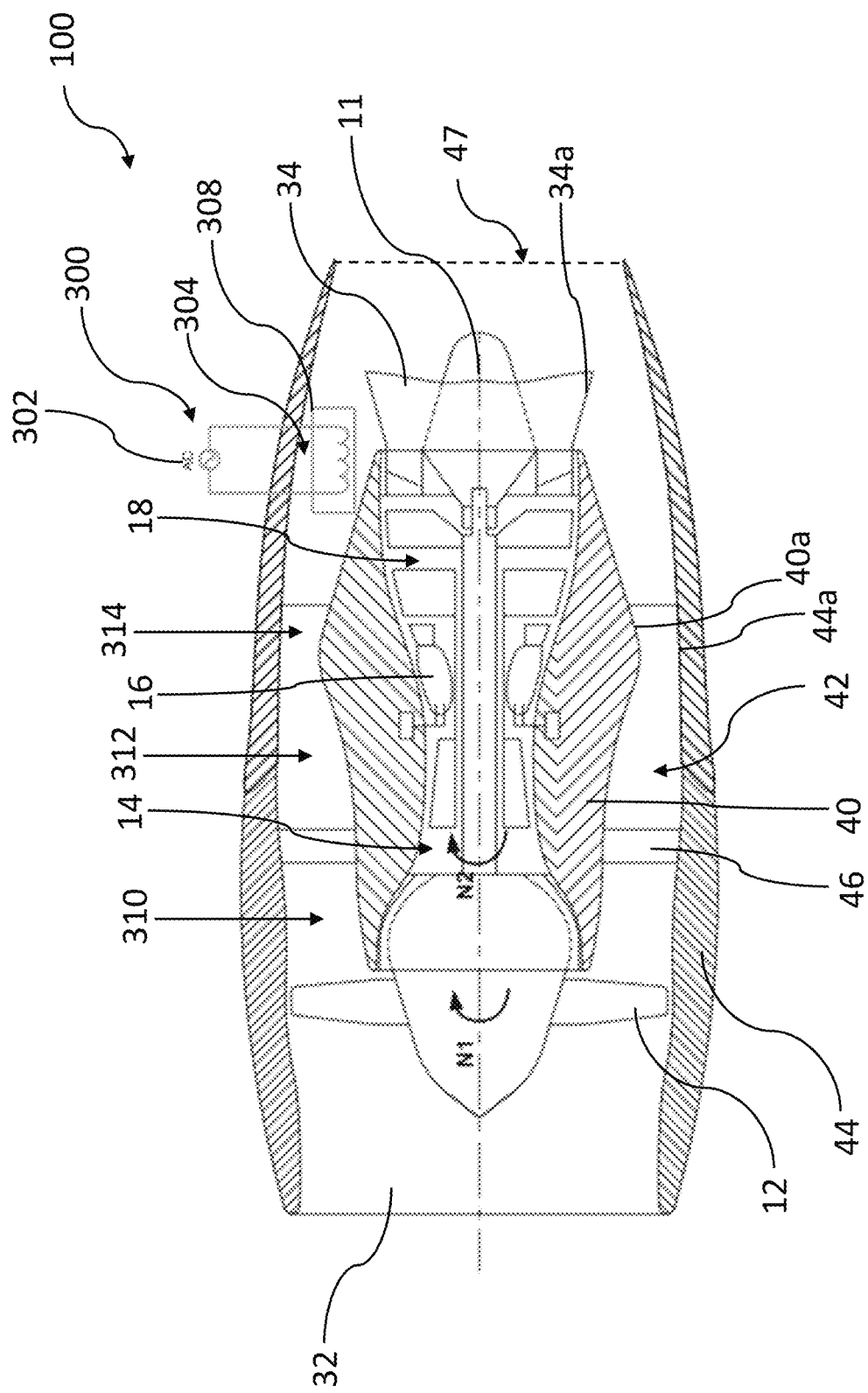
Figure 3C:
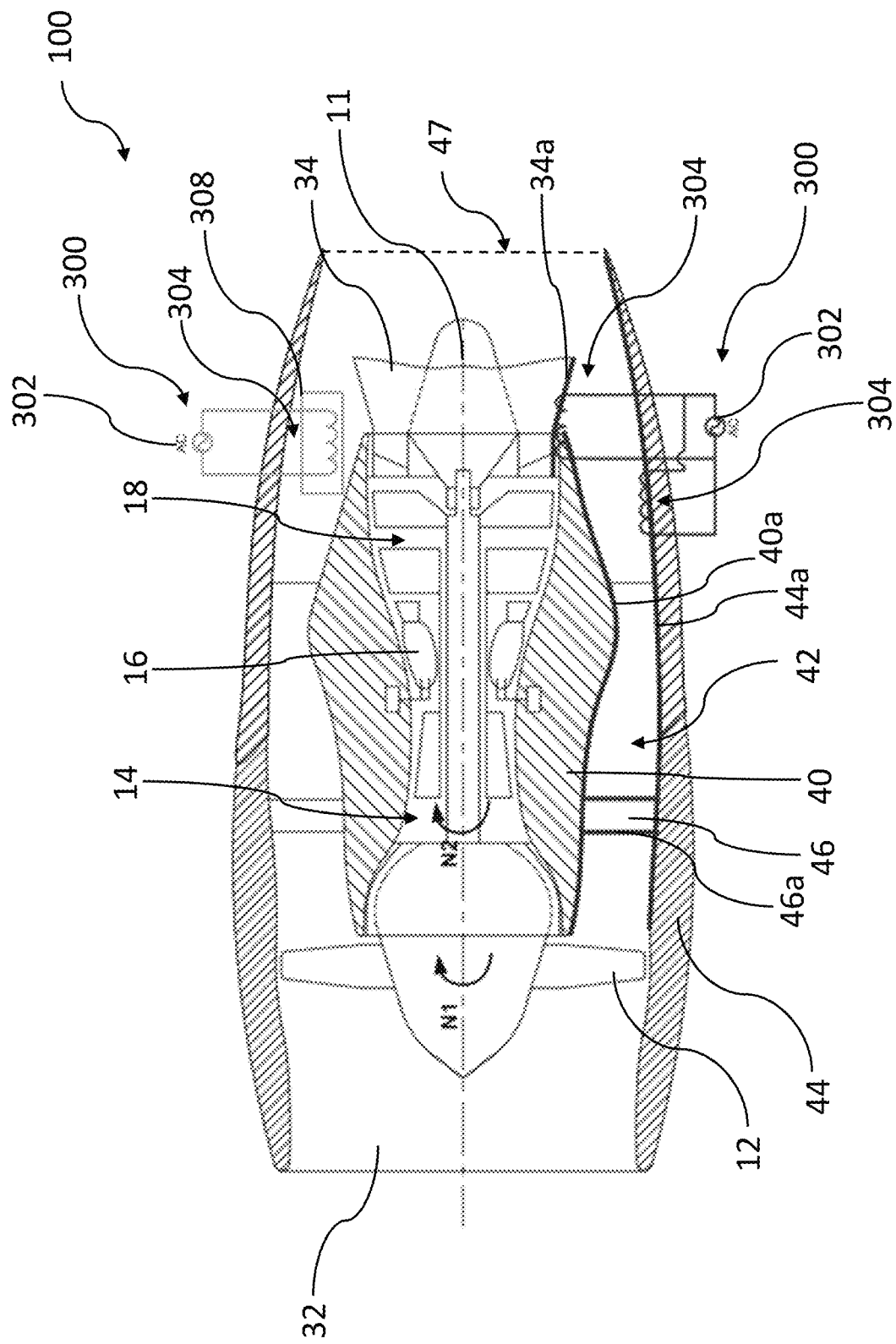

Referring to FIGS. 3A-3C, various configurations are shown to heat bypass air flowing through the bypass duct 42 towards the exhaust nozzle 47. In these examples, a heat source 300 is shown to include a current source 302 and a heating element 304. It will be understood that this is for illustrative purposes only and other heat sources may be used instead or in combination therewith.

In some embodiments, and as shown in FIG. 3A, existing engine surfaces are heated through conduction/induction heating. For instance, heating element(s) 304 may be applied to a radially outer surface 34a of the mixer nozzle 34, a radially outer surface 40a of the engine core 40 and/or a radially inner surface 44a of the engine casing 44. While FIG. 3A depicts positioning the heating element 304 at the intersection between surfaces 40a and 34a, in other embodiments, such surfaces 34a, 40a may individually or concurrently be heated with separate heating elements 304. In some embodiments, two or more heating elements 304 are operatively connected to a same current source 302. Alternatively, or in combination therewith, each heating element 304 may be operatively connected to its own current source 302. in some embodiments, heat may be applied to an outer surface 46a of one or more bypass struts 46. Any of the surfaces highlighted in bold in FIG. 3A may be heated so as to transfer heat convectively to bypass air flowing thereby. Other existing surfaces within the engine 100 may be contemplated as well. In some embodiments, and as shown in FIG. 3B, the conductive surfaces heated by the one or more heat source 300 may be one or more new surface 308, i.e. additional geometries, introduced within the engine 100. For instance, a new surface 308 may comprise a plurality of fins positioned in the bypass duct 42, upstream from the exhaust nozzle. The new surface 308 may also be positioned elsewhere along the bypass duct 42, such as locations 310, 312, and/or 314, for example. The new surface 308 may be attached to the inner surface 44a of the engine casing 44, the bypass struts 46, the outer surface 40a of the engine core 40, or any other location suitable for coming into contact with the bypass air without significantly affecting the performance of the engine 100. Other examples of a new surface 308 include arrays of fins, tubes, heated wires and the like. Such additional surfaces 308 should be designed to be substantially aerodynamic so as to minimize pressure loss, and noise created by their addition and avoid vortex-shedding to the extent possible. The additional surface 308 may be heated by a dedicated or existing power source 300, for instance an induction heater or other heater type. All of the embodiments for the power source 300 described with reference to FIG. 3A are also applicable to the new surface 308.

Figure 4:
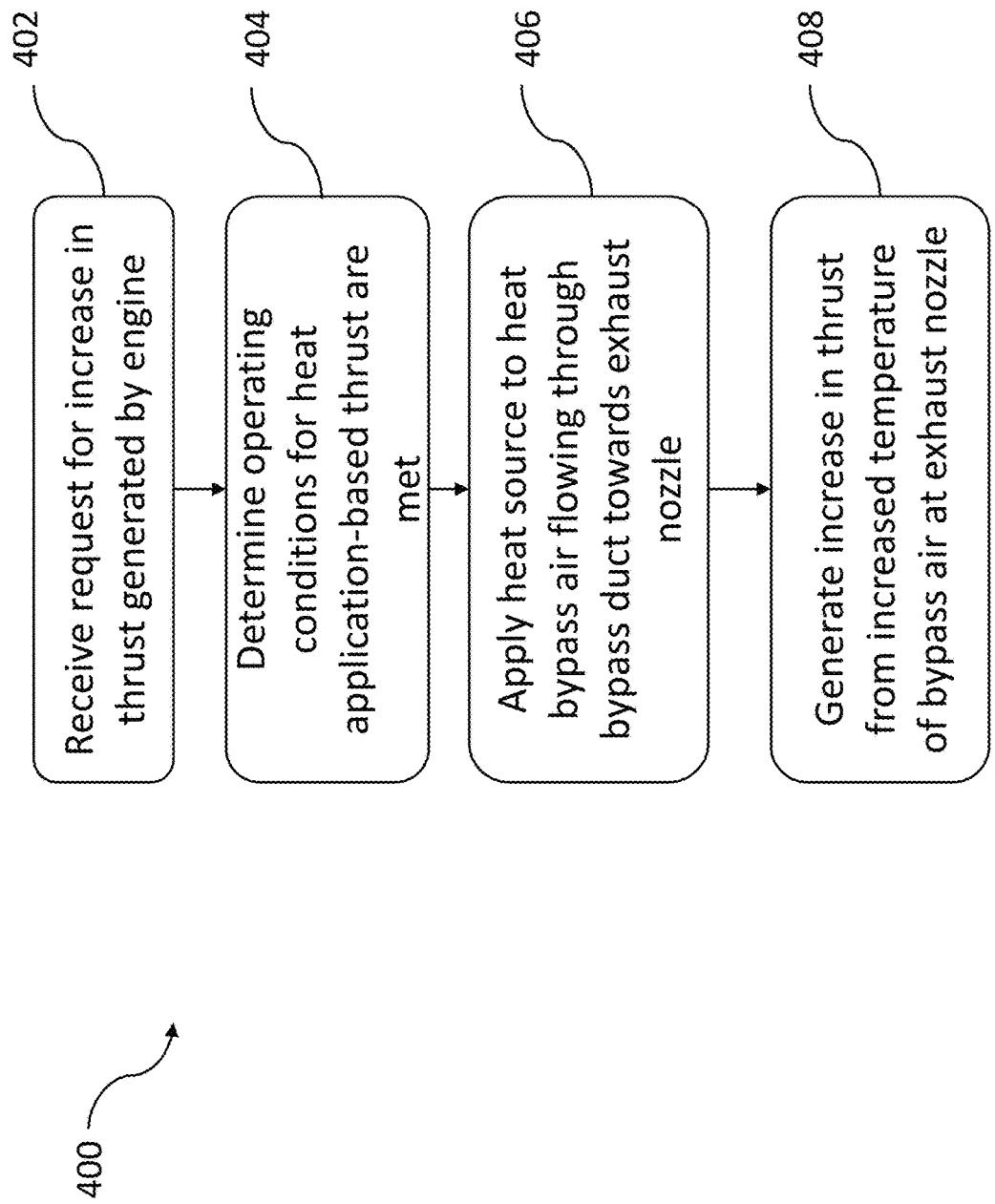
FIG. 4 is a flowchart illustrating an example method for operating the engines of FIGS. 3A-3C.

In other embodiments, and as shown in FIG. 3C, a combination of existing and new conductive surfaces may be provided to heat the bypass air flowing through the bypass duct 42 towards the mixer nozzle 34. In some cases, the same heat source 300 may be used to heat more than one conductive surface, while in other cases a plurality of heat sources 300 with respective current sources 302 and heating elements 304 may be provided. In some embodiments, a single current source 302 may be used to power multiple heating elements 304 for multiple surfaces. Other combinations may be contemplated as well. As the number and size of conductive surfaces increases, the potential for providing a greater amount of heat to the bypass air increases as well due to the greater heat transfer surface area provided by such conductive surfaces. In addition, the energy required is inversely proportional to the surface area of such conductive surfaces, so an increase in surface area may result in more efficient heating of the bypass air. For example, in ideal heat transfer conditions for a typical medium by-pass turbofan in the 10,000-20,000 lbf thrust class range, 0.3 MW to 0.9 MW of electrical power may be used to provide an increase of 5 to 15 Rankine (or 3 to 8 Kelvin) of the EGT, thus providing between 1% and 3% additional thrust. Referring to FIG. 4, there is shown an exemplary method 400 for operating an engine 100 to provide additional thrust in certain circumstances, the engine having an engine core 40, a bypass duct 42, and an exhaust nozzle 47 as described above. Such method 400 may be performed by the controller 110 in part or in whole.

At step 402, a request is received for an increase in thrust generated by the engine 100. In other words, the engine 100 is currently producing a given amount of thrust and the request is for more than the given amount of thrust. The request may come from a power lever of an aircraft, a thrust lever of the aircraft, a combined lever of the aircraft, or any other control mechanism operated by a pilot of the aircraft. In some embodiments, the request is generated by the controller 110 or another controller or computing device, such as an aircraft computer, in response to a detected state of the engine 100 or detected operating conditions of the aircraft.

At step 404, in response to the receipt of the request at step 402, it is determined if at least one operating condition for heat application-based thrust is met. As used herein heat application-based thrust refers to providing additional thrust by applying a heat source to heat bypass air flowing through the bypass duct towards the exhaust nozzle 47, as described herein. It will be understood that heat application-based thrust differs from other techniques for increasing thrust, such as increasing the speed of the fan 12 or the use of an afterburner. In some embodiments, heat application-based thrust may be used in combination with other techniques for increasing engine thrust. In some embodiments, the operating condition for heat application-based thrust is a choked state of the exhaust nozzle 47. In some embodiments, the operating conditions for heat application-based thrust are a choked state of the exhaust nozzle 47 and the fan 12 operating at a mechanical limit. In some embodiments, a choked state of the exhaust nozzle 47 is approximated using on-board engine model(s) and based on available inputs from aircraft and/or engine sensors. In some embodiments, a choked state of the exhaust nozzle 47 is predetermined and step 404 comprises confirming the choked state of the exhaust nozzle 47 by reading a flag or field having been set as a result of the predetermined choked state of the exhaust nozzle 47. In some embodiments, the operating conditions for heat application-based thrust are independent of the choked state of the exhaust nozzle and instead relate to other engine and/or aircraft parameters, for example an available ITT margin as determined from an ITT measurement. The controller 110 may consider one or more of an aircraft attitude, a Mach number, a rotational speed of the fan 12, an inlet total pressure, an ITT measurement, temperatures and/or pressures in the gas path, and a flight phase to determine whether at least one operating condition for heat application-based thrust is met.

At step 406, when the one or more operating condition is met, a heat source 300 is applied to heat bypass air flowing through the bypass duct 42 flowing towards the exhaust nozzle 47. In some embodiments, step 406 comprises applying the heat source 300 to at least one conductive surface of the engine 100 and heating the bypass air through convection heat-transfer from the at least one conductive surface to the bypass air, as discussed above. Alternatively, the bypass air is heated directly by the heat source 300. The amount of energy/heat applied can be modulated from minimum to maximum capacity based on the desired thrust increase.

At step 408, the increase in thrust is generated from an increase in temperature of the bypass air flowing through the bypass duct 42 and into the exhaust nozzle 47.

While method 400 has been herein described for use when engine thrust is limited by, for instance, the mechanical and thermal limits of the fan 12, it is understood that the method may be used to provide additional thrust under other choked exhaust nozzle 47 conditions, pending available energy from the applicable heat source 300.

Figure 5:
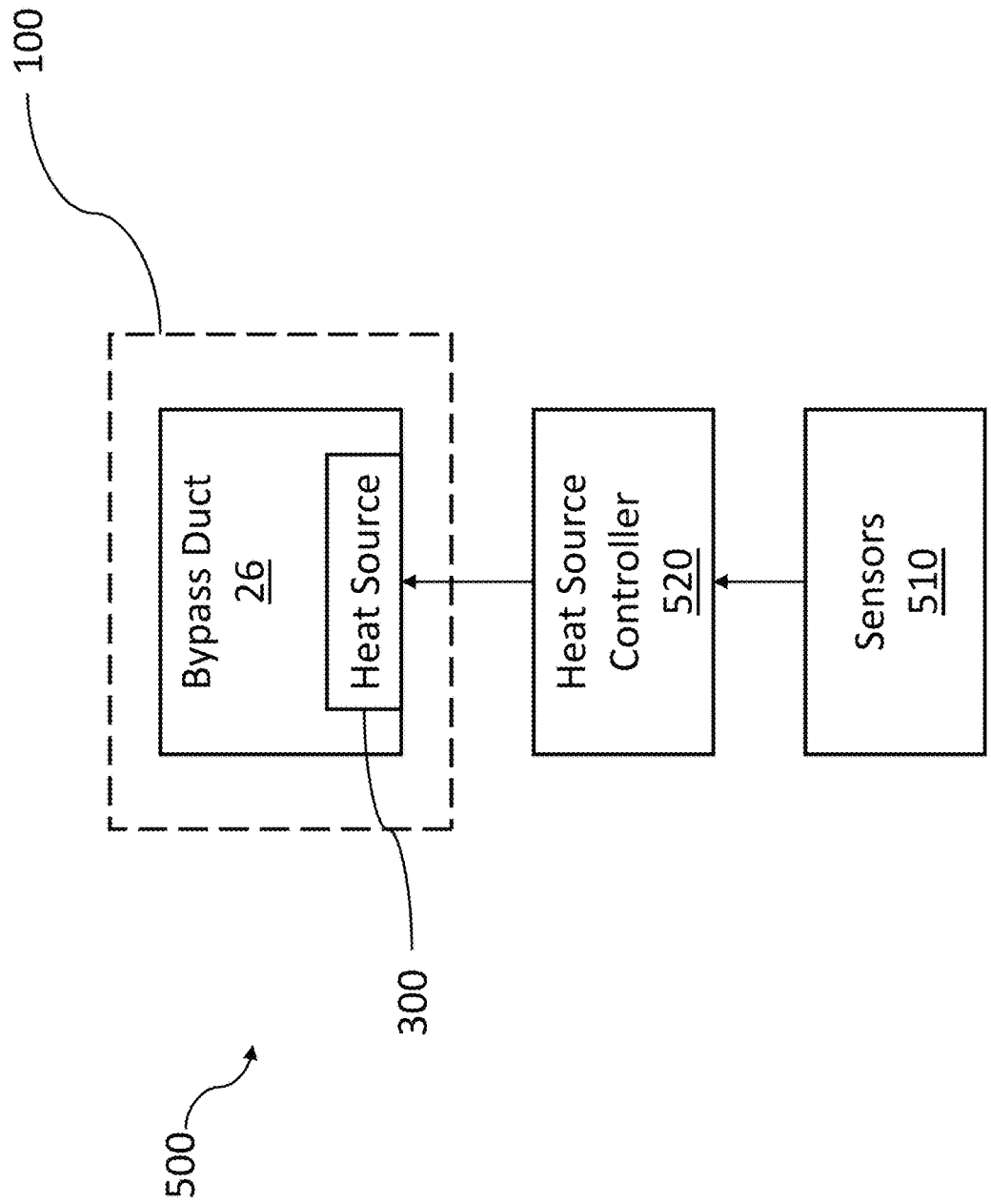
FIG. 5 is a block diagram of an example engine system for controlling one or more bypass duct heat sources.

Referring to FIG. 5, there is illustrated an engine system 500, which is composed of the engine 100, a plurality of sensors 510 and a heat source controller 520. It should be understood that certain elements of the engine 100, as shown in FIG. 5, are omitted to facilitate understanding. It is also understood that while only one heat source 300 is depicted in FIG. 5, a plurality of heat sources 300 may be provided, as discussed above.

The sensors 510 are configured for detecting various parameters for the engine 100 and/or aircraft. While the sensors 510 are shown as being external to the engine 100, it should be understood that one or more of the sensors 510 may form part of the engine 100. In various embodiments, the number, type and positioning of the sensors 510 may vary. The sensors 510 may be operable to determine that one or more operating condition for a choked state of the exhaust nozzle 47 are met, for instance by detecting one or more of an aircraft altitude, a Mach number, a rotational speed, temperatures or pressures of the engine 100, or a flight phase. As such, the sensors 510 may include altimeters, speed sensors, temperature sensors, pressure sensors, gyroscopes, as well as others types of sensors. Additionally, although illustrated here as physical sensors that are located at particular locations, it should be understood that in some cases, one or more of the sensors 510 can be virtual sensors, that is to say, instruments which make use of measurements from other sensors (physical or virtual) to derive a desired parameter (for example using on-board engine models).

The heat source controller 520 may form part of the controller 110 and be operable to control the one or more heat sources 300 based on, inter alia, information acquired from the sensors 510, which can include applying heat to one or more surfaces in the bypass duct 42. More particularly, applying heat may include diverting power from one or more power sources to one or more heaters, for instance induction heaters, which are positioned proximal to said conductive surfaces to be heated. As discussed above, applying heat to the bypass air in the bypass duct 42 may increase the exhaust gas temperature and thus the gas velocity at the exhaust nozzle 47, allowing for more engine thrust to be produced. The heat source controller 520 may thus be configured for operating the one or more heats sources 300 to selectively increase the thrust of the engine 100. In some embodiments, the engine thrust may be increased by approximately one to three percent, although other percent increases may be contemplated as well.

Figure 6:
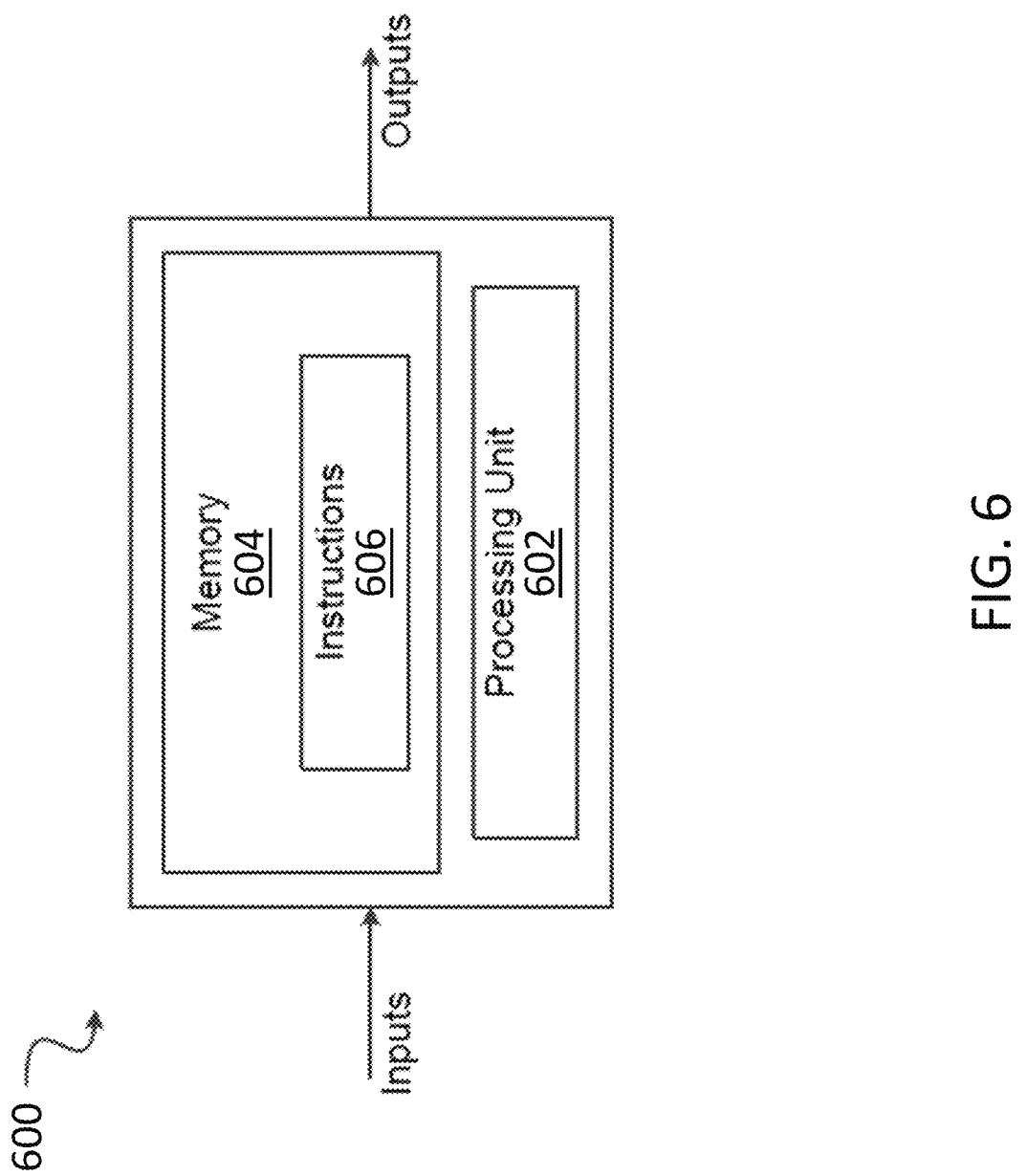
FIG. 6 is a block diagram of an example computing device.

With reference to FIG. 6, an example of a computing device 600 is illustrated. For simplicity only one computing device 600 is shown but the system may include more computing devices 600 operable to exchange data. The computing devices 600 may be the same or different types of devices. The heat source controller 520 may be implemented with one or more computing devices 600. Note that the heat source controller 520 can be implemented as part of a full-authority digital engine controls (FADEC) or other similar device, including electronic engine control (EEC), engine control unit (ECU), and the like.

The computing device 600 comprises a processing unit 602 and a memory 604 which has stored therein computer-executable instructions 606. The processing unit 602 may comprise any suitable devices configured to implement the method 400 such that instructions 606, when executed by the computing device 600 or other programmable apparatus, may cause the functions/acts/steps performed as part of the method 400 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems for operating an engine described herein may be implemented in a high level procedural or object oriented programming or scripting language, or a combination thereof, to communicate with or assist in the operation of a computer system, for example the computing device 600. Alternatively, the methods and systems for operating an engine may be implemented in assembly or machine language. The language may be a compiled or interpreted language. Program code for implementing the methods and systems for operating an engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating an engine may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for operating an engine, the engine having an engine core, a bypass duct, and an exhaust nozzle, the method comprising:
   receiving a request for an increase in thrust generated by the engine;
   in response to receipt of the request, determining that at least one operating condition for heat application-based thrust is met, the at least one operating condition for heat application-based thrust comprising a choked state of the exhaust nozzle;
   in response to the determining, applying a heat source to heat bypass air flowing through the bypass duct towards the exhaust nozzle; and
   generating the increase in thrust from an increased temperature of mixed bypass and core air at the exhaust nozzle.

2. The method of claim 1, wherein the at least one operating condition for heat application-based thrust includes at least two operating conditions for heat application-based thrust comprising the choked state of the exhaust nozzle and at least one of an aircraft altitude, a Mach number, a rotational speed of the engine, and a flight phase.

3. The method of claim 1, wherein applying the heat source comprises applying the heat source to at least one conductive surface in the engine and heating the bypass air through convection heat-transfer from the at least one conductive surface to the bypass air.

4. The method of claim 3, wherein the heat source is an induction heater and applying the heat source to the at least one conductive surface comprises inductively heating the at least one conductive surface.

5. The method of claim 3, wherein applying the heat source to the at least one conductive surface of the engine comprises applying the heat source to at least one existing engine surface.

6. The method of claim 5, wherein applying the heat source to at least one existing engine surface comprises applying the heat source to at least one of a radially outer surface of a mixer nozzle, a radially outer surface of the engine core, a radially inner surface of an engine casing surrounding the engine core and an engine bypass strut.

7. The method of claim 3, wherein applying the heat source to the at least one conductive surface of the engine comprises applying the heat source to at least one additional engine surface dedicated to heating the bypass air.

8. The method of claim 1, wherein applying the heat source comprises powering the heat source with at least one of a battery, a hydrogen fuel cell, and an auxiliary power unit.

9. The method of claim 8, wherein powering the heat source comprises drawing power from an existing power source in the engine.

10. A system for operating an engine, the engine having an engine core, a bypass duct, and an exhaust nozzle, the system comprising:
    a processor; and
    a non-transitory computer-readable medium having stored thereon program instructions executable by the processor for:
      receiving a request for an increase in thrust generated by the engine;
      in response to receipt of the request, determining that at least one operating condition for heat application-based thrust is met, the at least one operating condition for heat application-based thrust comprising a choked state of the exhaust nozzle;
      in response to the determining, applying a heat source to heat bypass air flowing through the bypass duct towards the exhaust nozzle; and
      generating the increase in thrust from an increased temperature of mixed bypass and core air at the exhaust nozzle.

11. The system of claim 10, wherein the at least one operating condition for heat application-based thrust includes at least two operating conditions for heat application-based thrust comprising the choked state of the exhaust nozzle and at least one of an aircraft altitude, a Mach number, a rotational speed of the engine, and a flight phase.

12. The system of claim 10, wherein applying the heat source comprises applying the heat source to at least one conductive surface in the engine and heating the bypass air through convection heat-transfer from the at least one conductive surface to the bypass air.

13. The system of claim 12, wherein the heat source is an induction heater and applying the heat source to the at least one conductive surface comprises inductively heating the at least one conductive surface.

14. The system of claim 12, wherein applying the heat source to the at least one conductive surface of the engine comprises applying the heat source to at least one existing engine surface.

15. The system of claim 14, wherein applying the heat source to at least one existing engine surface comprises applying the heat source to at least one of a radially outer surface of a mixer nozzle, a radially outer surface of the engine core, a radially inner surface of an engine casing surrounding the engine core and an engine bypass strut.

16. The system of claim 12, wherein applying the heat source to the at least one conductive surface of the engine comprises applying the heat source to at least one additional engine surface dedicated to heating the bypass air.

17. The system of claim 10, wherein applying the heat source comprises powering the heat source with at least one of a battery, a hydrogen fuel cell, and an auxiliary power unit.

18. The system of claim 17, wherein powering the heat source comprises drawing power from an existing power source in the engine.

19. An engine system comprising:
    an engine having an engine core, a bypass duct, and an exhaust nozzle;
    a heat source positioned relatively to at least one conductive surface of the engine; and
    a controller operatively coupled to the heat source and configured for applying heat from the heat source to the at least one conductive surface of the engine, and to generate an increase in thrust from an increased temperature of mixed bypass and core air at the exhaust nozzle through convection heating of the bypass air from the at least one conductive surface, the controller including:
a processor; and
a non-transitory computer-readable medium having stored thereon program instructions executable by the processor for:
 receiving a request for an increase in thrust generated by the engine;
 in response to receipt of the request, determining that at least one operating condition for heat application-based thrust is met, the at least one operating condition for heat application-based thrust comprising a choked state of the exhaust nozzle;
 in response to the determining, applying the heat source to heat bypass air flowing through the bypass duct towards the exhaust nozzle; and
generating the increase in thrust from the increased temperature of mixed bypass and core air at the exhaust nozzle.

* * * * *